(12) United States Patent
Pallapa et al.

(10) Patent No.: US 10,999,438 B1
(45) Date of Patent: May 4, 2021

(54) COMMUNICATION SESSION SCHEDULING QUEUE

(71) Applicant: West Corporation, Omaha, NE (US)

(72) Inventors: Gautham Pallapa, Omaha, NE (US); Santhosh Shetty, Omaha, NE (US)

(73) Assignee: INTRADO CORPORATION, Omaha, NE (US)

( * ) Notice: Subject to any disclaimer, the term of this patent is extended or adjusted under 35 U.S.C. 154(b) by 0 days.

(21) Appl. No.: 15/937,310

(22) Filed: Mar. 27, 2018

(51) Int. Cl.
*H04M 3/523* (2006.01)
*H04M 3/432* (2006.01)
*H04W 4/14* (2009.01)

(52) U.S. Cl.
CPC ........... *H04M 3/523* (2013.01); *H04M 3/432* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 6,088,444 | A * | 7/2000 | Walker | H04Q 3/64 379/266.02 |
| 7,050,567 | B1 * | 5/2006 | Jensen | H04M 3/5232 379/265.13 |
| 7,573,996 | B1 * | 8/2009 | Somani | H04M 3/5231 379/142.06 |
| 2009/0190744 | A1 * | 7/2009 | Xie | H04M 3/5232 379/265.11 |
| 2011/0125521 | A1 * | 5/2011 | Dhoble | G06F 19/3456 705/2 |
| 2014/0094134 | A1 * | 4/2014 | Balthasar | H04W 4/90 455/404.1 |
| 2016/0292373 | A1 * | 10/2016 | Spors | G06F 19/3406 |
| 2017/0228513 | A1 * | 8/2017 | Zhang | A61B 5/02055 |

* cited by examiner

*Primary Examiner* — Antim G Shah

(57) ABSTRACT

Processing user requests and calls may include receiving a request to establish a communication session from a user device, retrieving a user record associated with the user device, creating an event based on the request, storing the event in a queue, and selecting a queue position of the event based on one or more conditions stored in the user record.

14 Claims, 7 Drawing Sheets

COMMUNICATION SESSION SCHEDULING QUEUE

TECHNICAL FIELD OF THE APPLICATION

This application relates to communications between multiple parties and more particularly to providing a customer with a communication queue for managing scheduling of communication session.

BACKGROUND OF THE APPLICATION

Conventionally, when a customer calls a customer service representative, agent support system, etc., for various reasons, the customer may not obtain prompt access to a party of interest. For example, when a patient calls a hospital to check on the status of a laboratory result, such as bloodwork results or biopsy results, etc., the patient may not obtain access to the doctor or person required to answer the questions related to the patient's health concerns.

Obviously, there is some time available for personnel to contact the concerned patient. However, the patient should have some degree of knowledge of when to be available to answer the call or other communication session. This would require the patient to have some knowledge of an upcoming communication session, or at least a rough idea as to when they will be able to connect with the personnel.

Currently, in conventional approaches, the patient may have a pending laboratory result that needs to be discussed with a particular medical provider. The patient may not know when the results have arrived or when to attempt to contact the provider. A person may be categorized by the provider as an urgent matter or non-urgent matter and placed in a record database of persons to contact when time is available, but otherwise there is no urgency to communicate with most patients. The attempts to contact the patient or the provider can go back and forth until eventually both parties agree on a time that works for all parties. However, any simple interaction between the parties could optimize the overall burden of establishing a communication session.

SUMMARY OF THE APPLICATION

Example embodiments of the present application provide at least one of receiving a request to establish a communication session from a user device, retrieving a user record associated with the user device, creating an event based on the request, storing the event in a queue, and selecting a queue position of the event based on one or more conditions stored in the user record.

Another example embodiment may provide an apparatus that includes a receiver configured to receive a request to establish a communication session from a user device, and a processor configured to retrieve a user record associated with the user device, create an event based on the request, store the event in a queue, and select a queue position of the event based on one or more conditions stored in the user record.

Still another example embodiment may include a non-transitory computer readable storage medium configured to store instructions that when executed cause a processor to perform receiving a request to establish a communication session from a user device, retrieving a user record associated with the user device, creating an event based on the request, storing the event in a queue, and selecting a queue position of the event based on one or more conditions stored in the user record.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Figure 1:
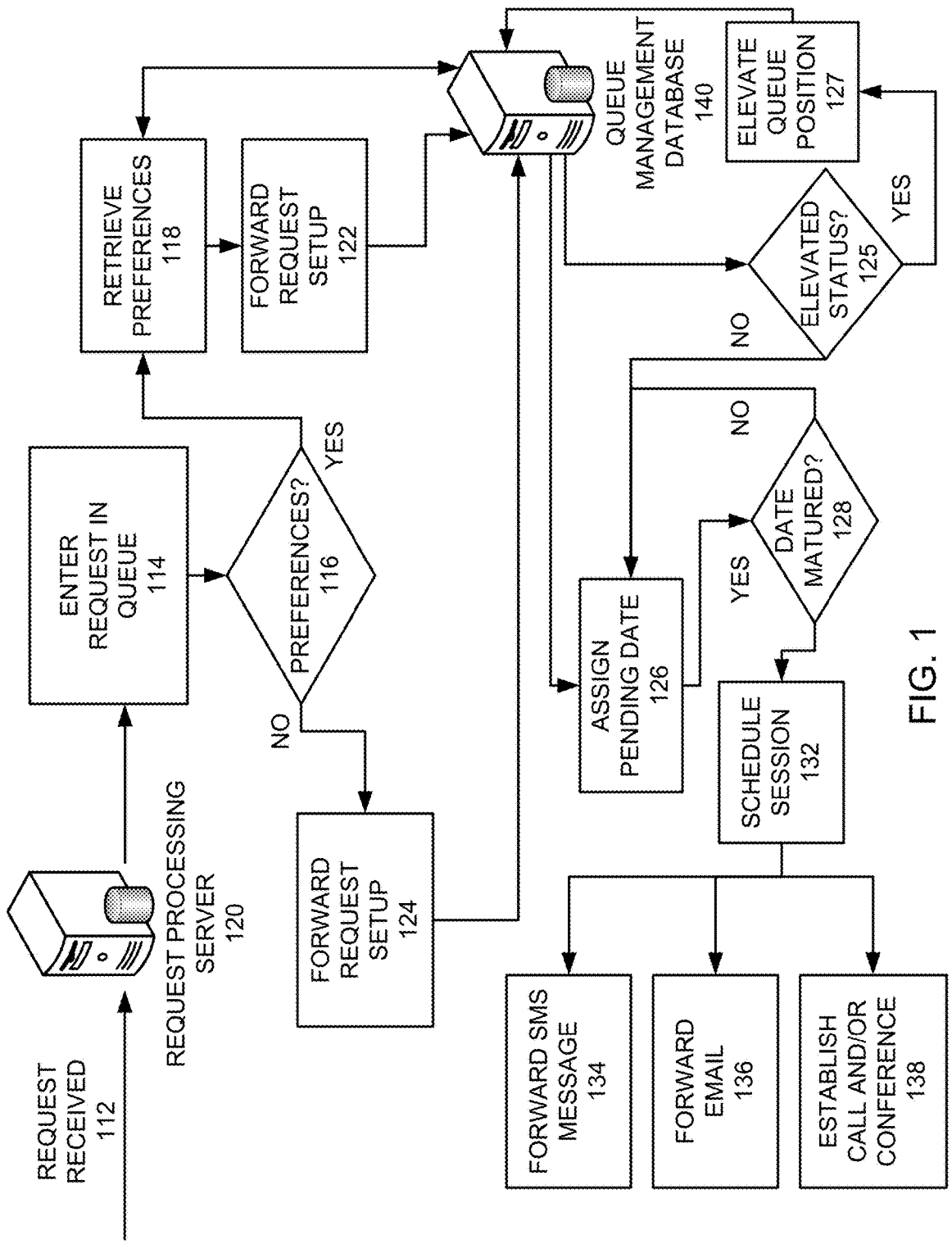
FIG. 1 illustrates an example communication logic diagram for receiving and processing communication session requests in a queue management configuration according to example embodiments of the present application.

FIG. 1 illustrates an example communication logic diagram for receiving and processing communication session requests in a queue management configuration according to example embodiments of the present application. Referring to FIG. 1, the configuration 100 may include a request being received 112 from a user device which may select an option on an installed application affiliated with the service provider (i.e., healthcare application) and/or initiate a text message (short message service (SMS)) and/or email and/or phone call to a customer support center operated by a request processing server 120. The server 120 may process the request and may also provide an interactive voice (IVR) processing platform to process callers' questions and provide automated caller options over a phone connection. The IVR platform may be a network including multiple processing servers for processing voice recognition and menu selection operations to satisfy customer needs. In this example, the network platform may utilize processing logic to respond and inquire as to the customer's needs, wants, concerns, etc. For a customer seeking medical attention (i.e., live chat, physician appointment, follow-up appointment, prescription refills, test result consultations, etc.), the call may be received and set to an active status with an active status flag, a timer representing an amount of time since the call has been answered, and other indicators which reflect a queue position for a customer/user since the call was placed. The processing logic may then initiate multiple modes of communication during the call to include a call voice channel as the initial communication channel, a short message service (SMS) communication channel which represents a second communication channel used to send messages to the user device 112 during the active call and an electronic mail communication channel used to send summary and follow-up emails to the user device based on content of the call.

In one specific example, when a call is placed and the user's intent is not known by the system processing logic. The call request is placed in a queue 114 managed by the queue management database 140, such as a first-in-first-out (FIFO) type of queue, but with an option to elevate queue position based on patient conditions stored in their profile. The call queue module may enact a queue placement for the received call and establish a queue position identifier based on the user device and the user account associated with the device. The queue placement may trigger a SMS message to be sent to the user device via the SMS processing module. The IVR call processing module may initiate a voice prompt that asks the user questions and receives and processes the voice of the user during the voice processing segments of the call. The SMS message may be a link to an application, website, etc. The link may be a trigger to launch an application installed on the user device. The SMS message may appear on the user device during the active call and the user may select the message and respond to a question, such as "What is your purpose for calling?" The user may respond by saying "I need to discuss my laboratory results". The processing logic may then identify the purpose of the response SMS message received from the user or via the voice of the user and parse the information to identify the purpose of the call.

Once an establish call purpose is identified, the user profile can then be used to identify the user's current physician group or assigned physician. The processing logic can then populate a menu of items for user entertainment, education, selling points, time saving efforts, etc. The logic may also retrieve relevant content, such as videos and menu items, studies, physician notes on the identified condition (i.e., flu), user blogs, live chats, videos, drug advertisements, etc., all of which are related to the customer's purpose. The user application on the user device may include a plurality of segments which can be populated with those identified menu items related to the context of the user's purpose, which is in this example an ailment. During the menu selection operations, a record and log may be created to identify the user's selections, videos watched, the exact locations the user was at when the call matured and stopped the video, etc. A record of all the user's selections and history during the call can then be placed in an e-mail as a summary that the user can identify and relate to at a later time. The content titles may be stored in a content databank and the session information may be stored in a session recording databank. It is important to note that the session recording may include audio from the call, however, user selections of the menu options, videos, audio, etc., accessed, commercials, studies, papers, blogs, etc., may all be logged for user convenience in returning to any or all of those selections once the call is complete. When the call is answered, the user may setup an appointment, speak to a physician, request information and/or perform any medical advice requests.

Continuing with the example of FIG. 1, the session request whether by request message, SMS message, call and/or email messaging, is received and processed to be submitted to the queue 114. The user profile stored in the processing server 120 and/or the queue management database 140 may be retrieved and examined to identify any user preferences 116, such as a communication medium preference, a calendar of acceptable contact times, a user age, health status, other persons responsible for the patient care, etc., all of which may be factors when attempting to schedule a future session. If there are no preferences, the request is forwarded 124 to the queue database 140. If the preferences exist for the user profile associated with the request, the preferences are retrieved 118 and forwarded to setup a session scheduling event 122 via the queue management database 140.

The preferences may include times of day, days of the week, communication medium preferences (i.e., SMS messaging, email, phone call, etc.), all of which are candidate times to be contacted for a communication session between the service provider and the user. Once all the information is retrieved and incorporated into the management database 140, a decision may be made to identify a current queue position of the new request entry and whether to elevate that queue position to a next queue position above the current queue position. This decision may begin with a determination as to whether there is an elevated status condition 125 in the user profile or not. Such a condition may include a user's age (e.g., above 55, 60, 65, below 6, 4, 2, 3 months, etc.). Any of those age thresholds may yield a weighted condition that is compared to a condition or lack thereof in a neighboring profile in the same queue. For example, ages above 65 or below 3 months may yield a triple weighted condition of importance, while the ages above 60 and below 2 may yield a double weighted condition and ages above 55 or below 4 yield a single weighted condition where the triple weights are higher priority than the double weights and the single weights. The queue position can be compared with the next higher queue position and any assigned weights associated with a session schedule entry may be compared to the next higher queue session schedule entry. If the session schedule entry below a previously queued entry it may be elevated above that entry based on a comparison of priorities between the two entries and the corresponding weights. Other reasons to apply weights may include chronic conditions, such as diabetes, previously documented stroke, cancer, etc. Any of those conditions may have a corresponding weight applied automatically similar to the age elevated conditions.

Once the elevated statuses are identified 125 and the queue is reorganized 127 and the queue positions are adjusted to account for necessary adjustments in the queue positions, the assignments of pending dates 126 may be performed so the dates are in the calendars and may be shared with the provider and users. When the dates have matured 128, the session may be scheduled 132 and assigned by a SMS message 134, a forwarded email 136 and/or a phone call or conference application 138 depending on the preferences.

The user device may communicate via a communication cloud that supports all the mobile device communication signaling mediums and protocols including but not limited to 3G/4G/LTE, SMS, PUSH mail, etc. The fundamental communication model may include an initial request message, call and/or a SMS message response responsive to receiving the message. The message may be an inquiry for information, such as user concerns, purpose for the call, user information, etc. The response may provide content that is spoken and/or typed. The user device may make selections, purchases, access data, etc., and the information may be logged and a follow-up e-mail may be sent to the user device responsive to those selections.

Figure 2A:
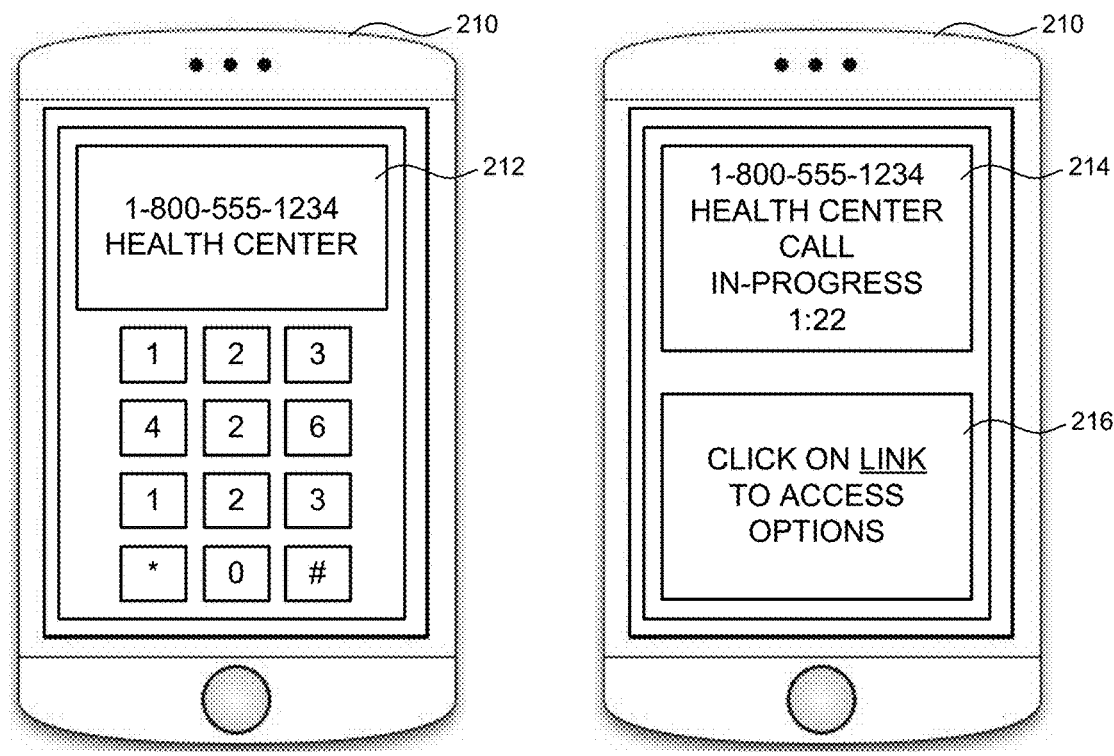
FIG. 2A illustrates a customer device user interface populated with session management information according to example embodiments of the present application.

FIG. 2A illustrates a customer device user interface populated with session management information according to example embodiments of the present application. Referring to FIG. 2A, the user interface examples 200 include the user mobile device 210 with a first interface example 212 that provides a dial-in number or other access option. The call may be monitored during the active progress 214 and the link may be selected 216 to access other options.

Figure 2B:
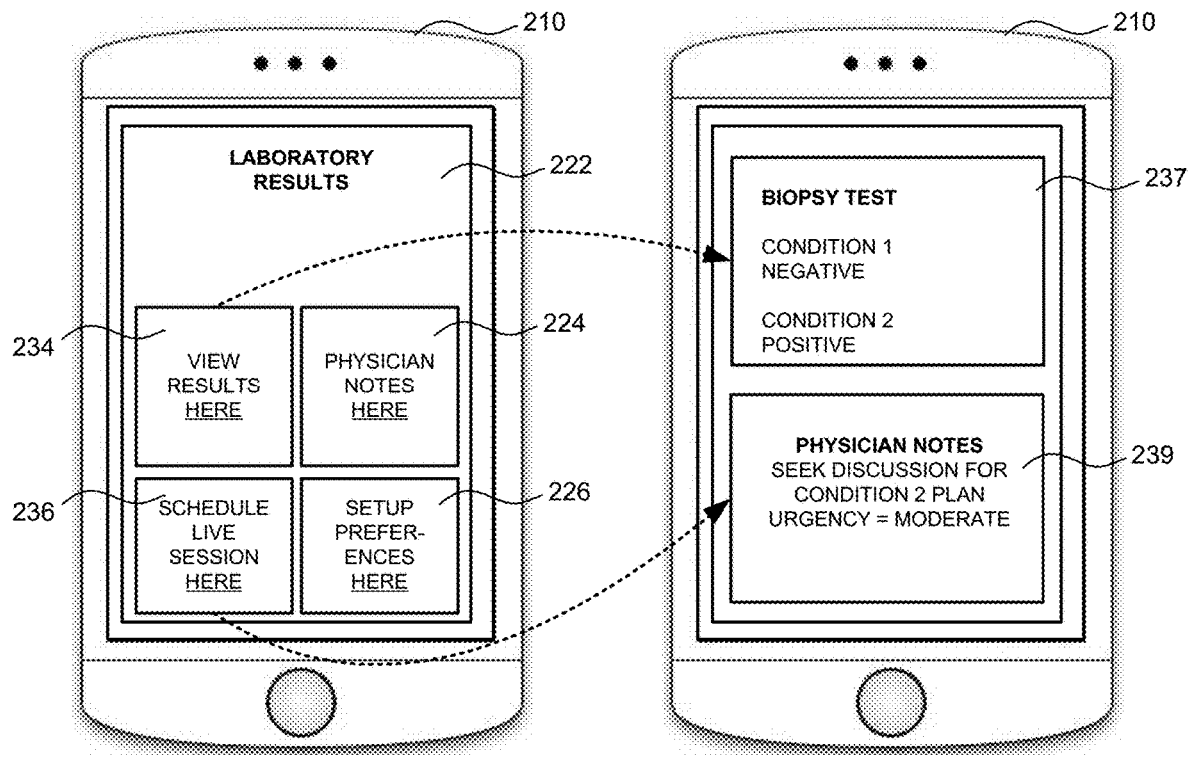
FIG. 2B illustrates another customer device user interface populated with session management information according to example embodiments of the present application.

FIG. 2B illustrates another customer device user interface populated with session management information according to example embodiments of the present application. Referring to FIG. 2B, the examples 250 include access to the user's personal interface 222 for a laboratory result. The options may include viewing the results 234, viewing the physician notes 224, scheduling a live session 236 and setting-up preferences for the live sessions 226. The example provides for selecting to view the results 237, which includes access to the physician notes and plan of action 239.

Figure 3:
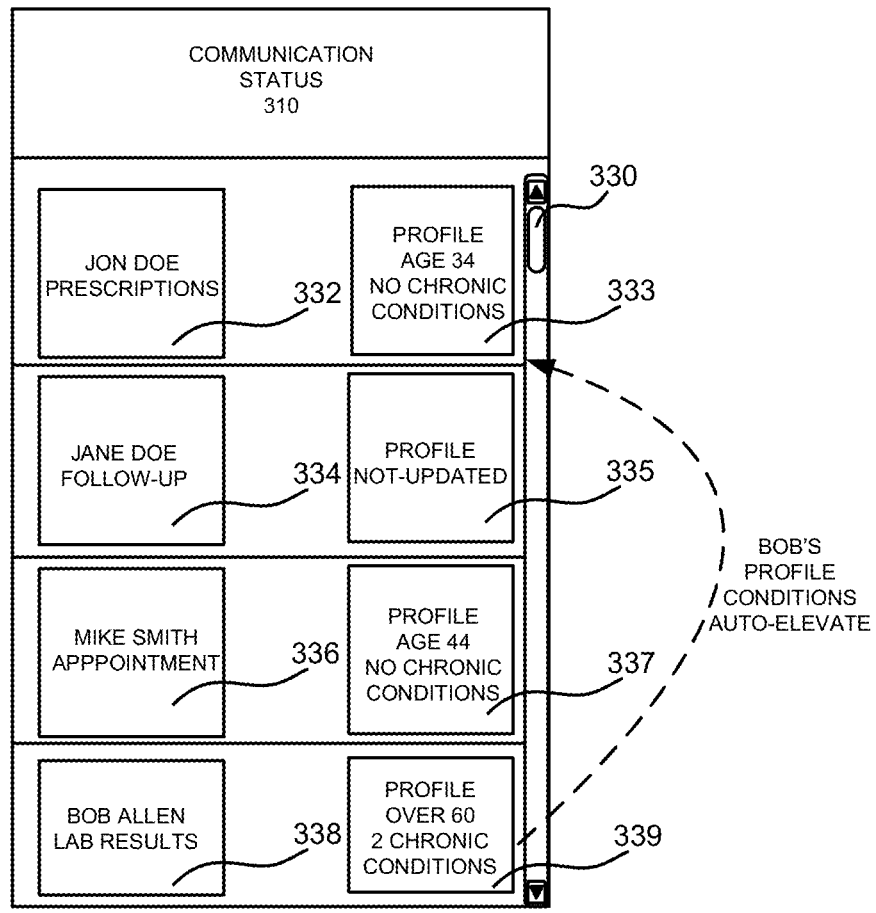
FIG. 3 illustrates a session queue management configuration for providing scheduling services for an active requests according to example embodiments of the present application.

FIG. 3 illustrates a session queue management configuration for providing scheduling services for active requests according to example embodiments of the present application. Referring to FIG. 3, the example illustrates a user interface of a communication status 310 of the queue managed by the queue management database server. The queue illustrates how the various user entries 332-338 and their corresponding profiles 333-339 are arranged in the queue. In this example, the over 60 individual "Bob Allen" has an elevated condition with an age of 60 and two known chronic conditions, the entry associated with that profile is categorized with a higher priority weight than any of the preceding entries. As a result, the entry for Bob Allen will be elevated straight to the top. A scroll tab option 330 may be presented for any number of entries which may be in the status screen.

Figure 4:
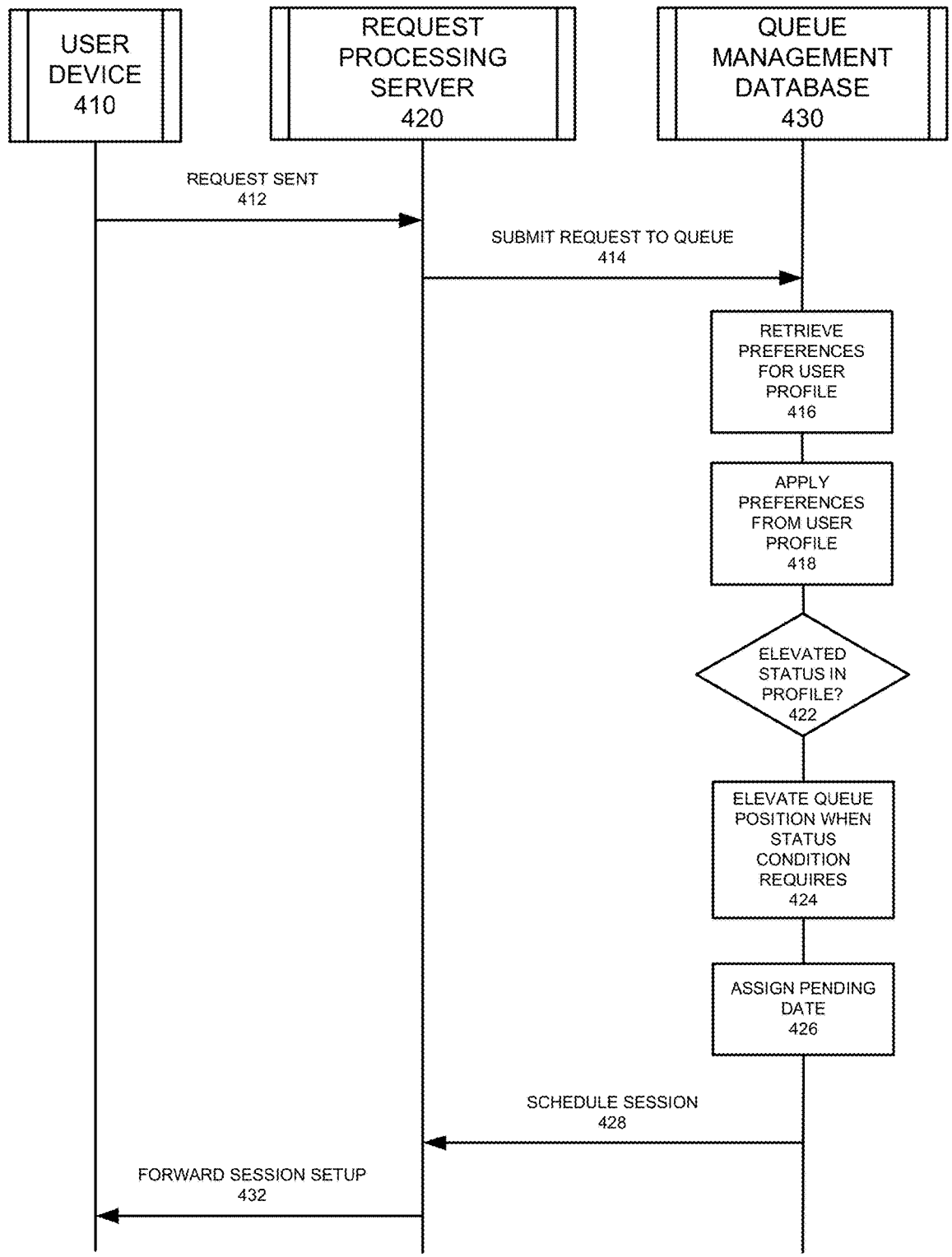
FIG. 4 illustrates a system signaling diagram for processing a session request with a queue management configuration according to example embodiments of the present application.

FIG. 4 illustrates a system signaling diagram for processing a session request with a queue management configuration according to example embodiments of the present application. Referring to FIG. 4, the system 400 includes a user device 410, a requesting processing server 420 and a queue management database 430. The example includes a request 412 being sent from the user device 410 to the processing server 420, which then submits that request 414 to the queue management database 430 for event placement. The queue management database 430 may perform various operations to organize and setup the event in the queue. The user profile associated with the request may be retrieved 416 and preferences may be applied 418 to setup the course of action when the event matures and the user is contacted to initiate a session. The profile may be further examined to determine whether there is a condition for elevating the status 422 by weighting the event according to the severity or number of conditions present. This will prioritize the event and modify an original queue position associated with the event when the event is elevated 424. The queued event may then be assigned a pending date 426 for the session. When the event matures, the session is scheduled 428 and forwarded to the user device 410 for a session setup 432.

Figure 5:
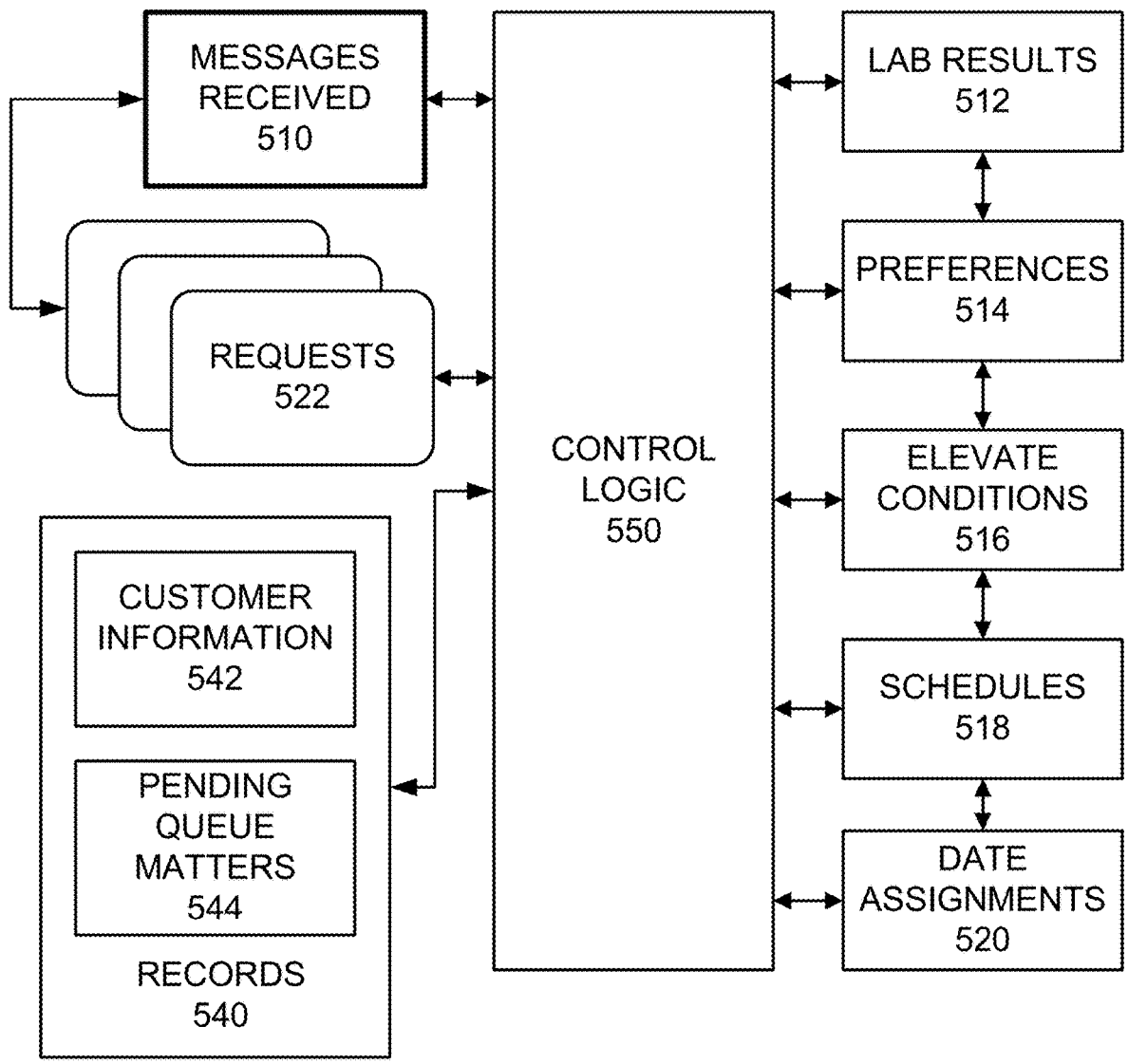
FIG. 5 illustrates a logic processing diagram of logical input data, a processing module and output data according to example embodiments of the present application.

FIG. 5 illustrates a logic processing diagram of logical input data, a processing module and output data according to example embodiments of the present application. Referring to FIG. 5, the configuration includes a control logic processor 550 which receives. Referring to FIG. 5, a logic configuration may provide various messages 510 being received regarding an inquiry to setup a communication session. Those messages may be in the form of requests 522. The requests may invoke a user profile query which is stored in records 540 that include the customer information 542 and any other pending queue matters 544. The logic processor 550 may process information from the profiles to determine prioritization and queue position. The resulting parameters may include lab results 512, preferences 514, elevated conditions 516, schedules 518 and/or date assignments 520. Such information may be considerations when scheduling communications sessions between the service provider and the customers.

One example embodiment may provide a call being received at the request processing server 120. The call will be assigned a placeholder or tag for the call queue of callers and entered in the queue. The caller or call device is identified as either a known caller or a new caller. The new callers will receive a link via a SMS message to a call setup menu application and/or web link. The user device may then populate the menu and a completed setup menu may be forwarded back to the request processing server. An account database may be updated to reflect changes or updates to the user account.

In the event that the caller is a returning caller, the caller's intent may be derived from a SMS response message response to an inquiry. Next, an application can then be loaded and user information, tips, advice, content, advertisements, call progress, etc., may all be selected and used to populate the application on the user's mobile device. A selection may be received and an action may be initiated based on the user selection, such as providing content or information by updating the user interface with retrieved content. Many actions may be performed on the user device and each selection during the active call may be logged and added to the log selections of a summary record which is then stored and forwarded to the mobile device as a summary e-mail. The matured call or active call may be moved to a live agent, which will automatically terminate the application session and log the user activity until such a time.

In one example embodiment, a user or customer attempting to call and access assistance at a medical treatment center may provide a caller attempting to obtain an appointment, a prescription, advice, a follow-up, etc. The call may be received via a call processing sever which then identifies the caller and obtains a caller record or profile to identify the caller in greater detail. The call is placed and the records are retrieved to identify the caller. A multi-mode module is responsible for generating and forwarding a SMS message to request additional information or forward the caller to a menu or web link for additional information. The received call may be forwarded to a live agent and a timer may be used to track the caller's active call status.

The user device may respond with updated information. The server can then identify the purpose of the call. The call may be received via a first communication medium and placed in a queue at an initial call queue position and designating the call as an active call status. The purpose of the call is identified and the call status is updated based on the call purpose. A position in the queue can be elevated responsive to identifying the call purpose. For example, the updated information, purpose of the call, etc., may be used to elevate the call in the call queue. The queue status can be shared with the multi-mode module and the queue can be updated accordingly.

Responsive to receiving the call, an authorization message may be generated and transmitted to the customer device via a second communication medium, such as SMS. An authorization response message may be sent to the server 714 which includes answers to questions or information that authorizes the customer account. The received information can be used to elevate the call queue position. In another example, responsive to receiving the call, an inquiry message can be created and sent to the customer device. The inquiry response message can be received and parsed to determine the call purpose based on the parsed inquiry response message, and elevated in the call queue position responsive to determining the call purpose. Additionally, an application on the user device may be initiated responsive to receiving the inquiry response message. A menu on the application can be populated with a plurality of menu options related to the inquiry response message.

The user may have user preferences which are predefined and can be retrieved from the customer record and applied to the menu options. During the initial authorization period, the customer device can be identified as a new customer. A registration web link can be created and sent as a SMS message to the customer device. The customer may access the SMS message and complete the registration from the customer device during the active call, and the call can be elevated in the queue position responsive to receiving the completed registration.

During an initial customer call process, a customer record is retrieved and a current customer status inquiry is created and sent to the customer device. In response, a current customer status response is received and a current customer status is identified. Content related to the current customer status is retrieved and the content is forwarded to the customer device. The current customer status response is parsed to identify a current customer health condition. Also, an assigned physician may be identified from a customer record. The customer may be forwarded a link message and a selection may be received to identify a customer status and health condition. At least one pre-recorded content file associated with the assigned physician and the current customer health condition can be retrieved and forwarded to the user device.

Among the menu selection options forwarded to the user device, a list of the plurality of menu option selections can be compiled responsive to the call being answered and a menu option summary message can be created which include the list of menu option selections. The menu option summary message may be sent to the customer via a third communication medium different from the first communication medium and the second communication medium. Among the multi-mode communications, the first communication medium may be a telephone medium, the second communication medium may be a short message service medium and the third communication medium may be an electronic mail (e-mail) medium. The caller may receive an invitation to participate in a communication session related to a context of the current customer status and accept the invitation. The call may be routed to the communication session and the active call may be maintained.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
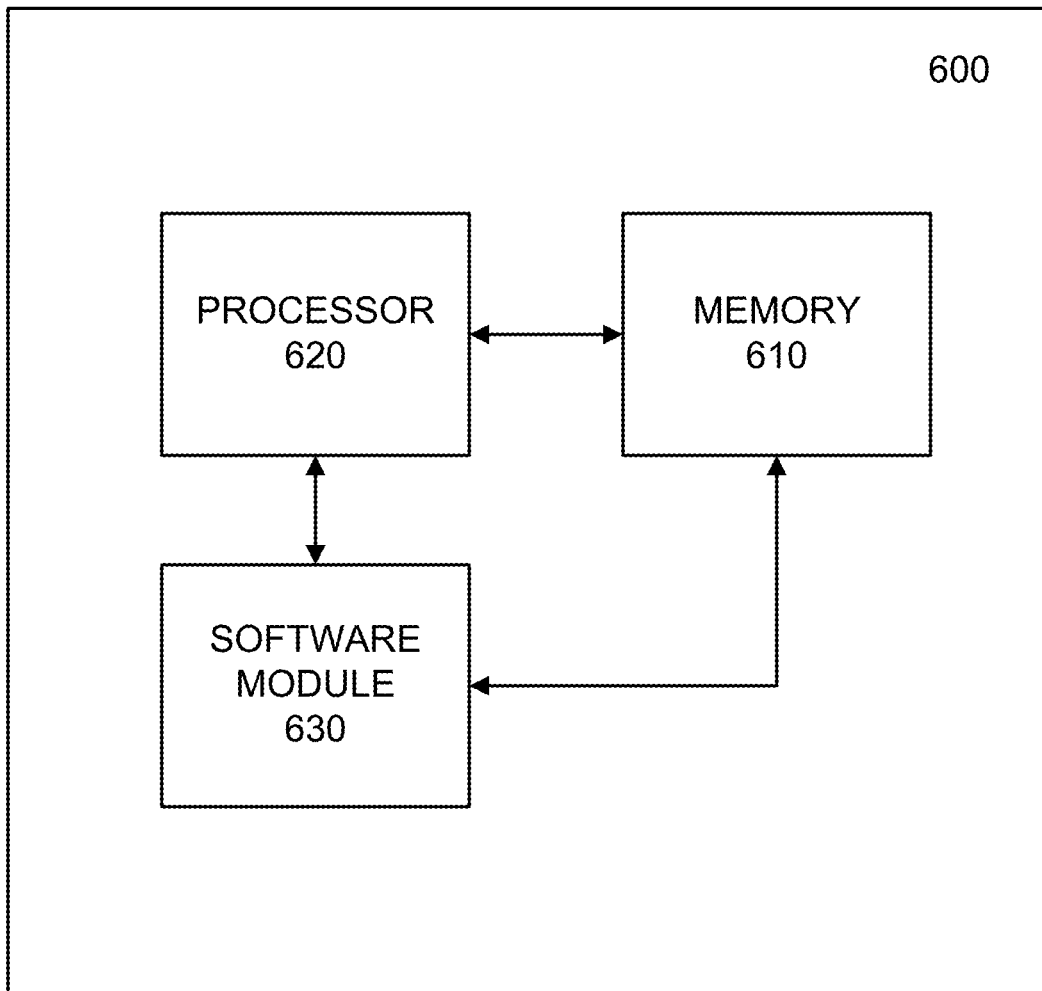
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving a request to establish a communication session from a user device;
   retrieving a user record associated with the user device;
   retrieving a user profile associated with a user of the user device, the user profile identifying one or more user preferences;
   creating an event based on the request;
   placing the event in a queue;
   sending a Short Message Service (SMS) message to the user device based on the placing the event in the queue;
   determining an elevated status condition exists from the user record based on one or more conditions stored in the user record and from a response received from the user device in response to the SMS message;
   identifying a weighted condition corresponding to the event based on the one or more conditions stored in the user record;
   applying a weight to the event based on the identified weighted condition, wherein the applied weight comprises one or more of a double weight or a triple weight, which is based on a user condition stored in the user record;
   elevating a queue position of the event based on the applied weight;
   creating a communication session when an event date associated with the event has matured; and
   establishing a communication session with the user device based on the one or more user preferences.

2. The method of claim 1, wherein the one or more conditions comprise one or more of:
   a user age, a user condition, and known chronic conditions.

3. The method of claim 1, further comprising:
   comparing the weight applied to the event to a weight applied to another event in a higher queue position than the event; and
   when the weight of the event is greater than the weight of the another event, elevating a queue position of the event above the another event.

4. The method of claim 1, further comprising:
   identifying at least one preferred communication medium associated with the user profile.

5. The method of claim 4, further comprising: assigning the event date to the event.

6. An apparatus, comprising:
a receiver configured to receive a request to establish a communication session from a user device; and
a processor configured to:
retrieve a user record associated with the user device,
retrieve a user profile associated with a user of the user device, the user profile identifying one or more user preferences;
create an event based on the request,
place the event in a queue,
send a Short Message Service (SMS) message to the user device based on the placing the event in the queue,
determine an elevated status condition exists from the user record based on one or more conditions stored in the user record and from a response received from the user device in response to the SMS message,
identify a weighted condition corresponding to the event based on the one or more conditions stored in the user record,
apply a weight to the event based on the identified weighted condition, wherein the applied weight comprises one or more of a double weight or a triple weight, which is based on a user condition stored in the user record,
elevate a queue position of the event based on the applied weighted condition,
create a communication session when an event date associated with the event has matured, and
establishing a communication session with the user device based on the one or more user preferences.

7. The apparatus of claim 6, wherein the one or more conditions comprise one or more of:
a user age, a user condition, and known chronic conditions.

8. The apparatus of claim 6, wherein the processor is further configured to:
compare the weight applied to the event to a weight applied to another event in a higher queue position than the event, and
when the weight of the event is greater than the weight of the another event, elevate a queue position of the event above the another event.

9. The apparatus of claim 6, wherein the processor is further configured to:
identify at least one preferred communication medium associated with the user profile.

10. The apparatus of claim 9, wherein the processor is further configured to: assign the event date to the event.

11. A non-transitory computer readable storage medium configured to store one or more instructions that when executed by a processor causes the processor to perform:
receiving a request to establish a communication session from a user device;
retrieving a user record associated with the user device;
retrieving a user profile associated with a user of the user device, the user profile identifying one or more user preferences;
creating an event based on the request;
placing the event in a queue;
sending a Short Message Service (SMS) message to the user device based on the placing the event in the queue;
determining an elevated status condition exists from the user record based on one or more conditions stored in the user record and from a response received from the user device in response to the SMS message;
identifying a weighted condition corresponding to the event based on the one or more conditions stored in the user record;
applying a weight to the event based on the identified weighted condition, wherein the applied weight comprises one or more of a double weight or a triple weight, which is based on a user condition stored in the user record;
elevating a queue position of the event based on the applied weight;
creating a communication session when an event date associated with the event has matured; and
establishing a communication session with the user device based on the one or more user preferences.

12. The non-transitory computer readable storage medium of claim 11, wherein the one or more conditions comprise one or more of:
a user age, a user condition, and known chronic conditions.

13. The non-transitory computer readable storage medium of claim 11, wherein the one or more instructions are further configured to cause the processor to perform:
comparing the weight applied to the event to a weight applied to another event in a higher queue position than the event; and
when the weight of the event is greater than the weight of the another event, elevating a queue position of the event above the another event.

14. The non-transitory computer readable storage medium of claim 11, wherein one or more instructions are further configured to cause the processor to perform:
identifying at least one preferred communication medium associated with the user profile.

* * * * *